United States Patent
Dieffenderfer et al.

(10) Patent No.: US 7,127,562 B2
(45) Date of Patent: Oct. 24, 2006

(54) ENSURING ORDERLY FORWARD PROGRESS IN GRANTING SNOOP CASTOUT REQUESTS

(75) Inventors: James Norris Dieffenderfer, Apex, NC (US); Bernard Charles Drerup, Austin, TX (US); Jaya Prakash Ganasan, Youngsville, NC (US); Richard Gerard Hofmann, Apex, NC (US); Thomas Andrew Sartorius, Raleigh, NC (US); Thomas Philip Speier, Holly Springs, NC (US); Barry Joe Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 10/458,998

(22) Filed: Jun. 11, 2003

(65) Prior Publication Data

US 2004/0255085 A1    Dec. 16, 2004

(51) Int. Cl.
*G06F 12/00* (2006.01)
(52) U.S. Cl. ......................... 711/146; 711/144; 711/145; 711/148; 711/150; 711/151; 711/168; 711/169
(58) Field of Classification Search ........ 711/140–148, 711/156, 150–151, 168, 169
See application file for complete search history.

(56) References Cited

U.S. PATENT DOCUMENTS

| | | | |
|---|---|---|---|
| 5,535,363 A | 7/1996 | Prince | 711/147 |
| 5,682,516 A * | 10/1997 | Sarangdhar et al. | 711/146 |
| 5,708,792 A | 1/1998 | Hayes et al. | 711/108 |
| 5,745,732 A | 4/1998 | Cherukuri et al. | 711/168 |
| 5,778,434 A * | 7/1998 | Nguyen et al. | 711/137 |
| 5,809,532 A | 9/1998 | Eno et al. | 711/141 |
| 5,809,536 A | 9/1998 | Young et al. | 711/144 |
| 5,812,815 A | 9/1998 | Yazdy | 711/140 |
| 5,829,040 A | 10/1998 | Son | 711/146 |
| 5,860,109 A | 1/1999 | Hagersten et al. | 711/141 |
| 5,893,151 A * | 4/1999 | Merchant | 711/140 |
| 5,966,729 A | 10/1999 | Phelps | 711/146 |
| 5,978,874 A | 11/1999 | Singhal | 710/107 |
| 6,029,204 A | 2/2000 | Arimilli et al. | 709/248 |
| 6,073,212 A | 6/2000 | Hayes et al. | 711/122 |
| 6,076,146 A | 6/2000 | Tran et al. | 711/125 |
| 6,269,425 B1 | 7/2001 | Mounes-Toussi et al. | 711/133 |
| 6,272,604 B1 | 8/2001 | Nunez et al. | 711/146 |
| 6,338,124 B1 | 1/2002 | Arimilli et al. | 711/144 |

(Continued)

*Primary Examiner*—Matthew Kim
*Assistant Examiner*—Hetul Patel
(74) *Attorney, Agent, or Firm*—Robert A. Voigt, Jr.; Winstead Sechrest & Minick P.C.

(57) ABSTRACT

A method and system for ensuring orderly forward progress in granting snoop castout requests. Masters may include a tag ("request tag") in their transfer requests to a bus macro. The request tag indicates the order of the request issued by the master. If the bus macro determines that the transfer request is snoopable, then the bus macro broadcasts a snoop request that includes the request tag. If a snoop controller determines that the address in the snoop request is a hit to a modified coherency granule in an associated cache, then the master associated with that snoop controller transmits a castout request to the bus macro that includes the request tag associated with the snoop request. The bus macro uses the request tag to determine whether the castout request is a response to the oldest in a series of pipelined snoop requests to be serviced.

12 Claims, 5 Drawing Sheets

U.S. PATENT DOCUMENTS

| | | | |
|---|---|---|---|
| 6,349,367 B1 | 2/2002 | Arimilli et al. | 711/143 |
| 6,408,362 B1 | 6/2002 | Arimilli et al. | 711/133 |
| 6,507,880 B1 * | 1/2003 | Arimilli et al. | 710/107 |
| 2003/0061545 A1 * | 3/2003 | Patwardhan et al. | 714/42 |
| 2004/0237005 A1 * | 11/2004 | Adkisson et al. | 714/55 |
| 2005/0044174 A1 * | 2/2005 | Landin et al. | 709/217 |

* cited by examiner

ENSURING ORDERLY FORWARD PROGRESS IN GRANTING SNOOP CASTOUT REQUESTS

TECHNICAL FIELD

The present invention relates to the field of cache snooping in a multiprocessor environment, and more particularly to ensuring orderly forward progress in granting snoop castout requests.

BACKGROUND INFORMATION

A multiprocessor system may comprise multiple processors coupled to a common shared system memory. Each processor may comprise one or more levels of cache memory. The multiprocessor system may further comprise a system bus coupling the processing elements to each other and to the system memory. A cache memory may refer to a relatively small, high-speed memory that contains a copy of information from one or more portions of the system memory. Frequently, the cache memory is physically distinct from the system memory. Such a cache memory may be integral with a processor in the system, commonly referred to as a Level-1 (L1) or primary cache, or may be non-integral with a processor in the system, commonly referred to as a Level-2 (L2) or secondary cache.

When a processor generates a read request and the requested data resides in its cache memory, e.g., L1 cache, then a cache read hit takes place. The processor may then obtain the data from the cache memory without having to access the system memory. If the data is not in the cache memory, then a cache read miss occurs. The memory request may be forwarded to the system memory and the data may subsequently be retrieved from the system memory as would normally be done if the cache did not exist. On a cache miss, the data that is retrieved from the system memory may be provided to the processor and may also be written into the cache memory due to the statistical likelihood that this data will be requested again by that processor. Likewise, if a processor generates a write request, the write data may be written to the cache memory without having to access the system memory over the system bus.

Hence, data may be stored in multiple locations, e.g., L1 cache of a particular processor and system memory. If a processor altered the contents of a system memory location that is duplicated in its cache memory, the cache memory may be said to hold "modified" data. The system memory may be said to hold "stale" or invalid data. Problems may result if another processor or bus agent, e.g., Direct Memory Access (DMA) controller, inadvertently obtained this "stale" or invalid data from system memory. Subsequently, it is required that processors or other bus agents are provided the most recent copy of data from either the system memory or cache memory where the data resides. This may commonly be referred to as "maintaining cache coherency." In order to maintain cache coherency, therefore, it may be necessary to monitor the system bus to see if another processor or bus agent accesses cacheable system memory. This method of monitoring the system bus is referred to in the art as "snooping."

Each cache may be associated with logic circuitry commonly referred to as a "snoop controller" configured to monitor the system bus for the snoopable addresses requested by a processor or other bus agent. Snoopable addresses may refer to the addresses requested by the processor or bus agent that are to be snooped by snoop controllers on the system bus. Snoop controllers may snoop these snoopable addresses to determine if copies of the snoopable addresses requested by the processor or bus agent are within their associated cache memories using a protocol commonly referred to as Modified, Exclusive, Shared and Invalid (MESI). In the MESI protocol, an indication of a coherency state is stored in association with each unit of storage in the cache memory. This unit of storage may commonly be referred to as a "coherency granule." A "cache line" may be the size of one or more coherency granules. In the MESI protocol, the indication of the coherency state for each coherency granule in the cache memory may be stored in a cache state directory in the cache subsystem. Each coherency granule may have one of four coherency states: modified (M), exclusive (E), shared (S), or invalid (I), which may be indicated by two or more bits in the cache state directory. The modified state indicates that a coherency granule is valid only in the cache memory containing the modified or updated coherency granule and that the value of the updated coherency granule has not been written to system memory. When a coherency granule is indicated as exclusive, the coherency granule is resident in only the cache memory having the coherency granule in the exclusive state. However, the data in the exclusive state is consistent with system memory. If a coherency granule is marked as shared, the coherency granule is resident in the associated cache memory and may be in one or more cache memories in addition to the system memory. If the coherency granule is marked as shared, all of the copies of the coherency granule in all the cache memories so marked are consistent with the system memory. Finally, the invalid state may indicate that the data and the address tag associated with the coherency granule are both invalid and thus are not contained within that cache memory.

A processor or other bus agent may generate a "transfer request" to be received by a unit commonly referred to as a "bus macro". A "transfer request" may refer to either a request to read an address not within the processor's or bus agent's associated cache memory(ies), a request to write to an address not owned by the processor's or bus agent's associated cache memory(ies), synchronization commands, address only requests, e.g., updating the state of a coherency granule, or translation lookaside buffer invalidation requests. The bus macro may be configured to determine if the received transfer request is snoopable. That is, the bus macro may be configured to determine if the received transfer request is to be broadcasted to the other snoop controllers not associated with the requesting processor or bus agent in order to determine if a copy of the requested snoopable address, i.e., a copy of the requested coherency granule, is within their associated cache memories. The broadcasted transfer request may commonly be referred to as a "snoop request."

In some multiprocessor systems, the performance of snooping may be enhanced through "snoop pipelining." Snoop pipelining may refer to the bus macro broadcasting multiple snoop requests prior to the completion of a previously issued snoop request. Hence, a higher snoop bus bandwidth (busses between the bus macro and snoop controllers) and lower overall snoop latency (duration of time for snoop requests to be completed) may be achieved. A snoop request may be said to be "completed" when the bus macro services that snoop request. The snoop request may typically be serviced by the bus macro after the bus macro receives a response to the snoop request from each of the snoop controllers. Servicing may include reading from or writing to an address in system memory as requested in the transfer request. Upon servicing the oldest in a series of pipelined snoop requests broadcasted, the bus macro may broadcast the next pipelined snoop request. That is, if the snoop pipeline is full, then the bus macro may broadcast the next pipelined snoop request upon servicing the oldest snoop request in the snoop pipeline. The bus macro may not broadcast the next pipelined snoop request until the oldest in a series of pipelined snoop requests is completed in order to maintain sequential consistency. Sequential consistency may refer to ensuring that a request, e.g., read from an address or write to an address, is completed in the proper order to ensure that the appropriate data is read from or written to memory, as well as to ensure that the program execution is correct.

If the bus macro received multiple transfer requests from one or more processors or bus agents during a single clock cycle and these multiple transfer requests are snoopable, then the bus macro may broadcast each transfer request, one at a time, based on an arbitration algorithm. Snoop controllers may monitor the system bus for these snoop requests (broadcasted transfer requests). If one or more of these snoop controllers detect a hit to the modified coherency granule in an associated cache, i.e., one or more snoop controllers detected that the state of the requested coherency granule was in the modified state, then these snoop controllers may issue a request, commonly referred to as a "snoop castout request," to the bus macro. The snoop castout request is a request to write the modified data in the cache associated with the requesting snoop controller to the system memory to maintain cache coherency. However, for a variety of reasons, the bus macro may receive these snoop castout requests out of order with respect to the order the snoop requests were broadcasted. For example, snoop castout requests may be received out of order due to the different response latencies among the different snoop controllers. The different response latencies may be caused by a variety of reasons such as slower clock cycles or caches in use. In another example, snoop castout requests may be received out of order due to what may be referred to as a "replacement castout". A replacement castout may refer to replacing a valid cache line in a cache with a new cache line where the replaced cache line is stored in a castout buffer to be castout ("replacement castout"). If there are snoop castout requests in the castout buffer along with a replacement castout, then the issuance of the snoop castout requests may be delayed if the replacement castout is issued prior to the issuance of the snoop castout requests.

Since not all snoop requests may result in a snoop castout request, the bus macro may be unable to determine the order of the snoop castout requests with respect to the order the snoop requests were broadcasted. Hence, the bus macro grants the snoop castout requests in the order they were received and not necessarily in the order the snoop requests were broadcasted. Hence, the oldest in a series of pipelined snoop requests may not necessarily be completed prior to a younger snoop request, thereby delaying the issuance of the next pipelined snoop request.

For example, if the bus macro received four transfer requests from four processors or bus agents (designated as masters 0–3) in the same clock cycle, then bus macro may broadcast these four transfer requests (designated as snoop requests 0–3) in an order based on an arbitration algorithm. For example, bus macro may first broadcast the transfer request (snoop request 0) received from master 0. Bus macro may subsequently broadcast the transfer request (snoop request 1) received from master 1 followed by broadcasting the transfer request (snoop request 2) received from master 2 followed by broadcasting the transfer request (snoop request 3) received from master 3. If one or more snoop controllers detect a hit to a modified coherency granule from the multiple snoop requests, e.g., snoop requests 2 and 3, then these one or more snoop controllers issue snoop castout requests to the bus macro. However, these snoop castout requests may be received out of order with respect to the order the snoop requests were broadcasted for one or more reasons as previously mentioned, e.g., a snoop castout request in response to snoop request 3 is received prior to receiving all the responses to snoop request 1. Since the bus macro grants the snoop castout requests in the order they were received and not necessarily in the order the snoop requests were broadcasted, snoop castout requests may be serviced out of the order the snoop requests were broadcasted. That is, the oldest in a series of pipelined snoop requests may not be serviced prior to a younger snoop request. Until the oldest in a series of pipelined snoop requests is serviced, the bus macro may not issue the next pipelined snoop request. Hence, by servicing a younger snoop request prior to servicing the oldest in a series of pipelined snoop requests, the issuance of the next pipelined request is delayed.

Therefore, there is a need in the art to ensure orderly forward progress in granting snoop castout requests.

SUMMARY

The problems outlined above may at least in part be solved in some embodiments by masters, e.g., processors, including a tag, referred to herein as the "request tag," in the transfer requests issued to the bus macro. The request tag indicates the order of the request issued by the master. If the bus macro determines that the transfer request is snoopable, the bus macro may broadcast the transfer request ("snoop request") that includes a snoop request tag. The snoop request tag may include the request tag associated with the transfer request. If a snoop controller determines that the address in the snoop request is a hit to a modified coherency granule in an associated cache, then the snoop controller may transmit a castout request to the bus macro that includes a castout request tag. The castout request tag includes the request tag associated with the broadcasted transfer request. The bus macro may use the request tag to determine whether or not the castout request is a response to the oldest in a series of pipelined snoop requests to be serviced. If the castout request is a response to the oldest in a series of pipelined snoop requests to be serviced, then the bus macro may service the castout request. If the castout request is not a response to the oldest in a series of pipelined snoop requests to be serviced, then the bus macro may wait to service the received castout request until this castout request is a response to the oldest in a series of pipelined snoop requests to be serviced, thereby ensuring orderly forward progress in servicing snoop castout requests.

In one embodiment of the present invention, a method for ensuring forward progress in granting snoop castout requests may comprise the step of receiving a plurality of snoopable transfer requests from one or more masters, e.g., processors. Each snoopable transfer request may comprise a request tag. The request tag may identify an order of a request issued from a master. The method may further comprise broadcasting the plurality of snoopable transfer requests in an order where each broadcasted snoopable transfer request comprises the request tag. The method may further comprise receiving a castout request comprising a first request tag associated with a first snoopable transfer request. The method may further comprise servicing the castout request in the order of broadcasting the plurality of snoopable transfer requests based on the first request tag.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and system for ensuring orderly forward progress in granting snoop castout requests. In one embodiment of the present invention, masters, e.g., processors, may include a tag ("request tag") in their transfer requests to a bus macro. The request tag may indicate the order of the request issued by the master. If the bus macro determines that the transfer request is snoopable, the bus macro may broadcast snoop request that includes the request tag. If a snoop controller determines that the address in the snoop request is a hit to a modified coherency granule in an associated cache, then the snoop controller may transmit a castout request to the bus macro that includes the request tag associated with the snoop request. If the castout request is a response to the oldest in a series of pipelined snoop requests to be serviced, then the bus macro may service the castout request. If the castout request is not a response to the oldest in a series of pipelined snoop requests to be serviced, then the bus macro may wait to service the received castout request until this castout request is a response to the oldest in a series of pipelined snoop requests to be serviced, thereby ensuring orderly forward progress in servicing snoop castout requests.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

FIG. 1—System

Figure 1:
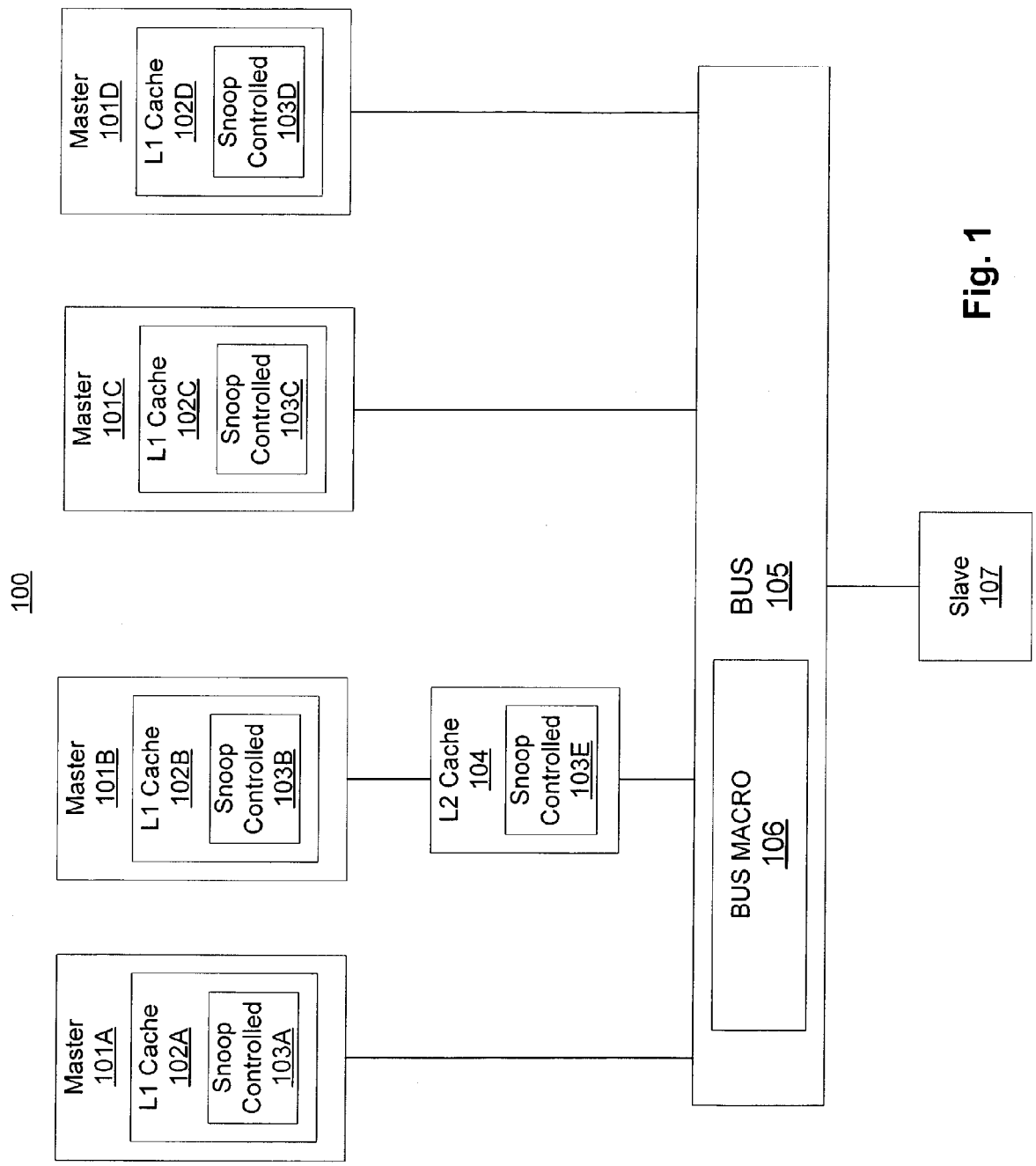
FIG. 1 illustrates a multiprocessor system configured in accordance with an embodiment of the present invention.

FIG. 1 illustrates an embodiment of a system 100 in accordance with the present invention. System 100 may comprise one or more masters 101A–D, e.g., processors. Masters 101A–D may collectively or individually be referred to as masters 101 or master 101, respectively. Masters 101A–D may each comprise a level one (L1) cache 102A–D, e.g., L1 instruction/data cache, respectively. L1 caches 102A–D may be configured to store instruction and data values that may be repeatedly accessed by masters 101A–D, respectively. L1 caches 102A–D may collectively or individually be referred to as L1 caches 102 or L1 cache 102, respectively. It is noted that those skilled in the art will recognize that multiple L1 caches, e.g., L1 instruction cache, L1 data cache, may be implemented instead of a unified L1 cache. L1 caches 102A–D may each include snoop controllers 103A–D, respectively, configured to monitor system bus 105 for snoopable addresses requested by masters 101 as discussed in greater detail further below in conjunction with FIGS. 2–3. It is further noted that system 100 may comprise any number of masters 101, any number of L1 caches 102 and any number of snoop controllers 103 and that FIG. 1 is illustrative.

In order to minimize data access latency, one or more additional levels of cache memory coupled to master 101, e.g., master 101B, may be implemented such as a level two (L2) cache 104 coupled to master 101B. The lower cache levels, e.g., L2 cache 104, may be employed to stage data to an L1 cache, e.g., L1 cache 102B, and typically have progressively larger storage capacities but longer access latencies. L2 cache 104 may include snoop controller 103E configured to monitor system bus 105 for snoopable addresses requested by masters 101 as discussed in greater detail further below in conjunction with FIGS. 2–3. Snoop controller 103E may be configured similarly as snoop controllers 103A–D. Snoop controllers 103A–E may collectively or individually be referred to as snoop controllers 103 or snoop controller 103, respectively. It is noted that masters 101A–D may each be coupled to any number of additional levels of caches. It is further noted that each level of cache may comprise snoop controller 103 configured to monitor system bus 105 for snoopable addresses requested by masters 101.

Referring to FIG. 1, each master 101 may be coupled to a bus macro 106. System 100 may further comprise a slave 107, e.g., memory, coupled to bus macro 106. Bus macro 106 may subsequently permit the transfer of information, e.g., addresses, data, between masters 101 and slave 107. It is noted that system 100 may comprise any number of slaves 107 coupled to bus macro 106.

Referring to FIG. 1, master 101 may generate a "transfer request" to be received by bus macro 106. A "transfer request" may refer to either a request to read an address not within its associated cache memory(ies), a request to write to an address not exclusively owned by its associated cache memory(ies), synchronization commands, address only requests, e.g., updating the state of a coherency granule, or translation lookaside buffer invalidation requests. Bus macro 106 may be configured to determine if the received transfer request is snoopable ("snoopable transfer request"). That is, bus macro 106 may be configured to determine if the received transfer request is to be broadcasted to the other snoop controllers 103 not associated with master 101 that generated the transfer request. The other snoop controllers 103 may be configured to determine if a copy of the requested snoopable address, i.e., a copy of the requested coherency granule(s), is within their associated cache memories 102, 104. The broadcasted transfer request may commonly be referred to as a "snoop request."

As stated in the Background Information section, if the bus macro received multiple transfer requests from multiple processors or bus agents during a single clock cycle and these multiple transfer requests are snoopable, then the bus macro may broadcast each transfer request, one at a time, based on an arbitration algorithm. Snoop controllers may monitor the system bus for these snoop requests (broadcasted transfer requests). If one or more of these snoop controllers detect a hit to the modified coherency granule in an associated cache, i.e., one or more snoop controllers detected that the state of the requested coherency granule was in the modified state, then these snoop controllers may issue a request, commonly referred to as a "snoop castout request," to the bus macro. The snoop castout request is a request to write the modified data in the cache associated with the requesting snoop controller to the system memory to maintain cache coherency. However, the bus macro may receive these snoop castout requests out of order with respect to the order the snoop requests were broadcasted. Since not all snoop requests may result in a snoop castout request, the bus macro may be unable to determine the order of the snoop castout requests with respect to the order the snoop requests were broadcasted. Hence, the bus macro grants the snoop castout requests in the order they were received and not necessarily in the order the snoop requests were broadcasted. Hence, the oldest in a series of pipelined snoop requests may not necessarily be completed prior to a younger snoop request thereby delaying the issuance of the next pipelined snoop request. Therefore, there is a need in the art to ensure orderly forward progress in granting snoop castout requests. A mechanism for ensuring orderly forward progress in granting snoop castout requests is described below in conjunction with FIGS. 2–3. A method for ensuring orderly forward progress in granting snoop castout requests is described further below in conjunction with FIG. 4.

Figure 2:
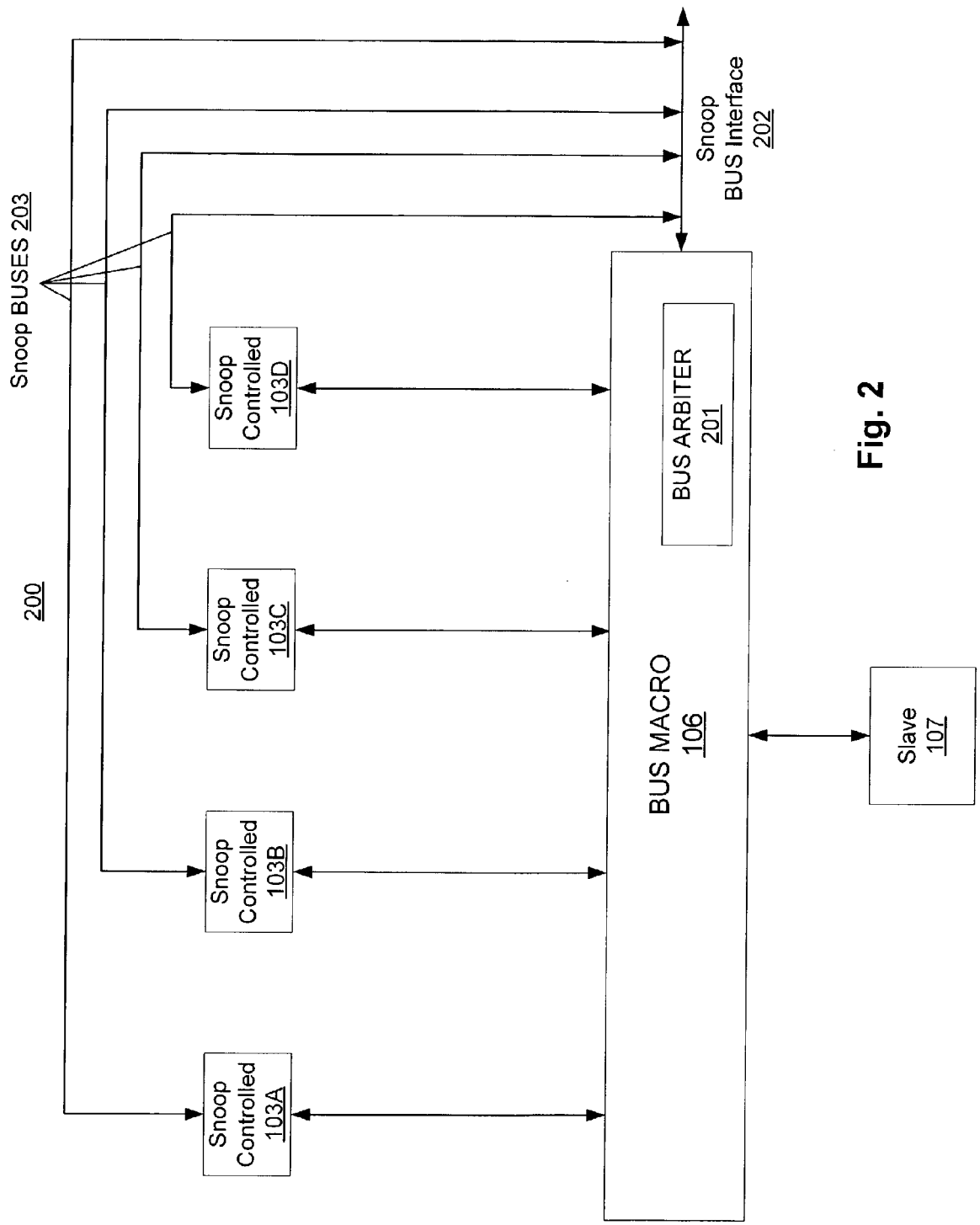
FIG. 2 illustrates an interaction between snoop controllers and a bus macro in accordance with an embodiment of the present invention.

FIG. 2—Mechanism for Ensuring Orderly Forward Progress in Granting Snoop Castout Requests FIG. 2 illustrates an embodiment of the present invention of a mechanism 200 in system 100 (see FIG. 1) for ensuring orderly forward progress in granting snoop castout requests. Mechanism 200 may comprise bus macro 106 (see FIG. 1) configured to interconnect one or more snoop controllers 103A–D (see FIG. 1) with one or more slaves 107 (see FIG. 1), e.g., memory. Bus macro 106 may comprise a bus arbiter 201 configured to recognize an incoming request from master 101 as snoopable. Bus macro 106 may further be configured to broadcast the snoop request to the other snoop controllers 103 not associated with the requesting master 101 via snoop bus interface 202 while concurrently broadcasting the snoop request to the targeted slave 107 (targeted slave 107 refers to the slave 107 that master 101 requests to read from or write to). Snoop bus interface 202 may be configured to interface shared snoop bus 203 between snoop controllers 103 in system 100 and bus macro 106. Shared snoop bus 203 may include individual busses between particular snoop controllers 103 and bus macro 106. These individual busses may be used by bus macro 106 to transmit snoop requests to particular snoop controllers 103 and to receive snoop responses from snoop controllers 103. It is noted that mechanism 200 may comprise any number of snoop controllers 103 and slaves 107 and that FIG. 2 is illustrative.

Referring to FIG. 2, in conjunction with FIG. 1, bus macro 106 may receive multiple transfer requests from master(s) 101. It is noted that the multiple transfer requests may be received in a single clock cycle. Each transfer request issued from master 101 may include a tag, referred to herein as a "request tag." The request tag may include information regarding the particular order of the request, e.g., $5^{th}$ request, issued by master 101. For example, if master 101, e.g., master 101A, issued its $5^{th}$ transfer request, then the request tag may include the binary value of 0101 in a 4-bit request tag. Furthermore, each master 101 may assert either a read or a write line (not shown) coupled between master 101 and bus macro 106 based on whether the transfer request is a request to read from or write to an address.

Upon receiving the transfer requests, bus arbiter 201 may determine if the received transfer requests are snoopable ("snoopable transfer requests") by reading the encoded transfer attributes in the transfer requests.

Bus macro 106 may be configured to broadcast the received snoopable transfer requests ("snoop requests") to the non-requesting masters 101 in a particular order on shared snoop bus 203 via snoop bus interface 202. In one embodiment, bus macro 106 may be configured to track the order the snoop requests were broadcasted, at least in part, by associating each snoop request with the order, e.g., $5^{th}$ request, the snoopable transfer request was issued by master 101. Each snoop request issued from bus macro 106 may include a tag, referred to herein as a "snoop request tag." In one embodiment, the snoop request tag may include a concatenation of the request tag, a read/write indicator and a master identifier as illustrated in FIG. 3.

Figure 3:
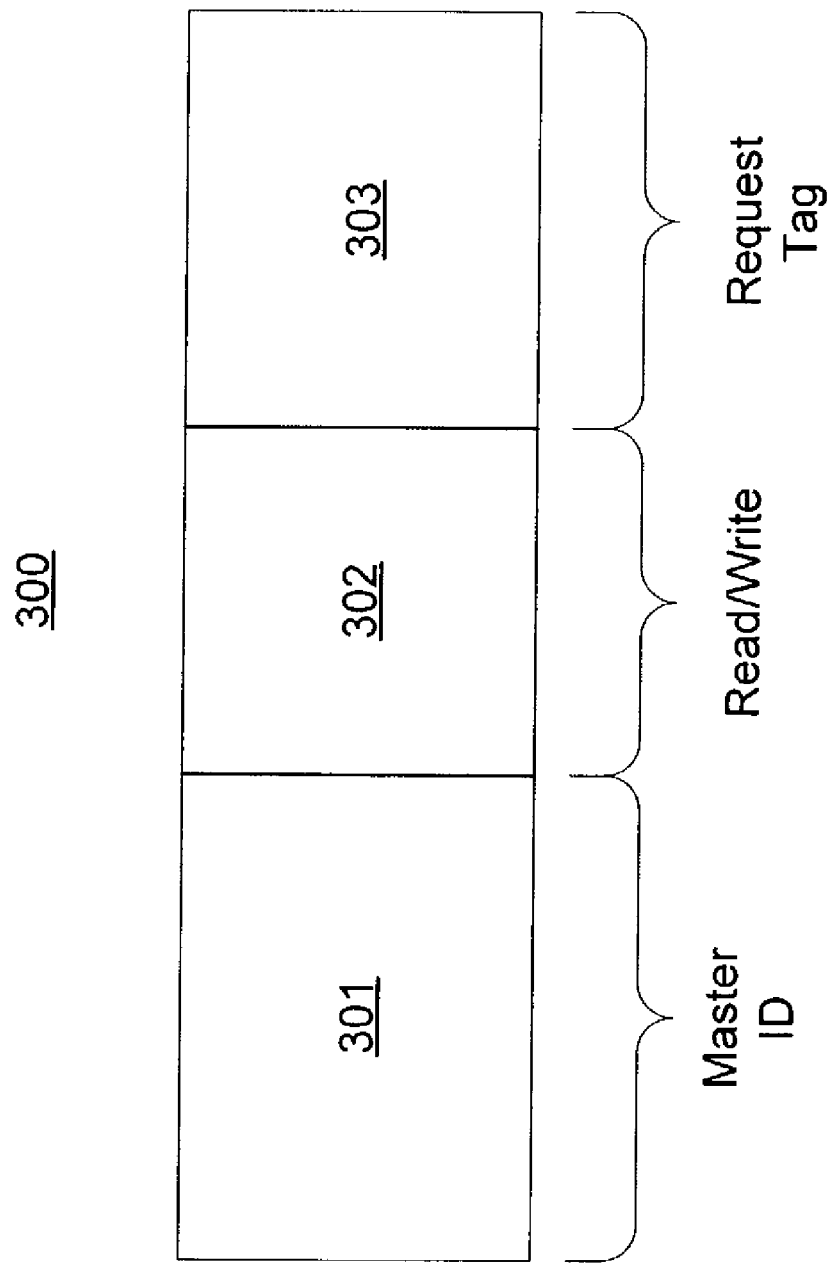
FIG. 3 illustrates an embodiment of the present invention of a snoop request tag.

Referring to FIG. 3, FIG. 3 illustrates an embodiment of the present invention of a snoop request tag 300 comprising a master identification field 301, e.g., 4-bit field, a read/write tag 302, e.g., 1-bit field, and the request tag 303, e.g., 4-bit field. The master identification field may include a value used to identify the master 101, e.g., master 101A, that transmitted the transfer request. For example, if master 101A is identified by the binary value of 0001, then the binary value of 0001 may be inserted in field 301. In one embodiment, bus macro 106 may be configured to identify the master 101 that transmitted the received snoopable transfer request and insert a binary value identifying that master 101 in field 301. The read/write tag 302 may indicate whether the snoopable transfer request is a request to read from or write to an address. In one embodiment, master 101 may indicate whether its transfer request is a read or write request by asserting or de-asserting a line (not shown) coupled between master 101 and bus macro 106. The request tag 303 is the request tag received from the master 101 transmitting the snoopable transfer request.

As stated above, bus macro 106 may be configured to broadcast the snoop requests with the associated snoop request tags in a particular order on shared snoop bus 203 via snoop bus interface 202. Broadcasting snoop requests, as used herein, may refer to broadcasting the snoop requests to snoop controllers 103 not associated with the requesting master 101. In one embodiment, if bus macro 106 receives multiple snoopable transfer requests in a single cycle, bus macro 106 may be configured to broadcast the received snoopable transfer requests in a particular order using an arbitration algorithm of bus arbiter 201. It is noted that bus arbiter 201 may be configured to implement any type of arbitration algorithm and that such algorithms are known to persons of ordinary skill in the art. It is further noted that such algorithms would fall within the scope of the present invention.

Snoop controllers 103 may be configured to snoop the addresses in associated caches 102, 104 using the addresses in the snoop requests broadcasted on shared snoop bus 203. If snoop controller 103 detects a hit to either the modified, exclusive or shared coherency granule in its associated cache, e.g., L1 cache 102A, then snoop controller 103 may transmit a response to bus macro 106 indicating such a hit. If snoop controller 103 does not detect a hit to either the modified, exclusive or shared coherency granule in its associated cache, e.g., L1 cache 102A, then the data and the address tag associated with the coherency granule are both invalid. In one embodiment, snoop controllers 103 may indicate whether there is a hit or not to either the modified, exclusive or shared coherency granule in its associated cache by asserting or de-asserting a "hit line" (not shown) connected between bus macro 106 and each snoop controller 103.

If a snoop request is a request to read from an address with an intent-to-modify and a snoop controller 103, e.g., snoop controller 103A, detected a hit to a modified coherency granule in its associated cache, e.g., L1 cache 102A, then snoop controller 103 may be configured to transmit an indication ("castout indication") indicating a "castout request" will be transmitted. In one embodiment, snoop controller 103 may transmit a zero value tag to bus macro 106 indicating a "castout request" will be transmitted. In another embodiment, snoop controllers 103 may indicate a castout request will be transmitted by asserting a "castout line" (not shown) connected between bus macro 106 and each snoop controller 103. Upon the transmission of a castout indication, master 101, associated with snoop controller 103 that transmitted the castout indication, may transmit the castout request to bus macro 106 to castout the coherency granule(s) before reading the requested information from slave 107. The castout request may include a tag, referred to herein as the "castout request tag." That is, if a snoop request is a request to read from an address with an intent-to-modify and a snoop controller 103, e.g., snoop controller 103A, detected that the state of the requested coherency granule was in the modified state, then master 101, associated with snoop controller 103 that detected a hit to the modified coherency granule, may be configured to transmit a castout request to bus macro 106 to castout the coherency granule(s) before reading the requested information from slave 107. The castout request tag may be identical to the snoop request tag, which includes the request tag associated with the snoop request, to enable bus arbiter 201 to determine the order of the castout request with respect to the order the snoop requests were broadcasted.

As stated above, snoop controllers 103 may transmit to bus macro 106 an indication of whether there was a cache hit and a castout in response to the snoop requests broadcasted by bus arbiter 201. Upon receiving responses to a snoop request from each snoop controller 103, where each response is not a snoop castout indication, bus macro 106 may be configured to service the snoop request in the order they were broadcasted. That is, if each snoop controller 103 in response to a snoop request did not assert the castout line, then the requests, e.g., read/read, to slave 107 proceed as normal.

If bus macro 106 receives an indication of a castout request to be transmitted, then bus arbiter 201, upon receipt of the snoop castout request, may be configured to determine if the castout request is a response to the oldest in a series of pipelined snoop requests to be serviced using the request tag received with the snoop castout request. If the castout request is not a response to the oldest in a series of pipelined snoop requests to be serviced, then the castout request will not be serviced, i.e., will not be immediately broadcasted to slave 107. The castout request may be serviced later when the castout request is a response to the oldest in a series of pipelined snoop requests to be serviced. Further, if the castout request is not a response to the oldest in a series of pipelined snoop requests to be serviced, then data intervention may not be enacted. Data intervention may refer to bus macro 106 providing the data in the castout request to both slave 107 and the requesting master 101 concurrently.

If the castout request is a response to the oldest in a series of pipelined snoop requests to be serviced, then the castout request will be serviced. Further, if the castout request is a response to the oldest in a series of pipelined snoop requests to be serviced, then data intervention may be implemented.

By bus arbiter 201 determining whether the castout request is a response to the oldest in a series of pipelined snoop requests to be serviced from the request tag included in the castout request tag, bus macro 106 ensures orderly forward progress in granting snoop castout requests. By ensuring orderly forward progress in granting snoop castout requests, bus macro 106 may issue the next pipelined snoop request with less delay thereby improving the efficiency of snoop pipelining.

Figure 4:
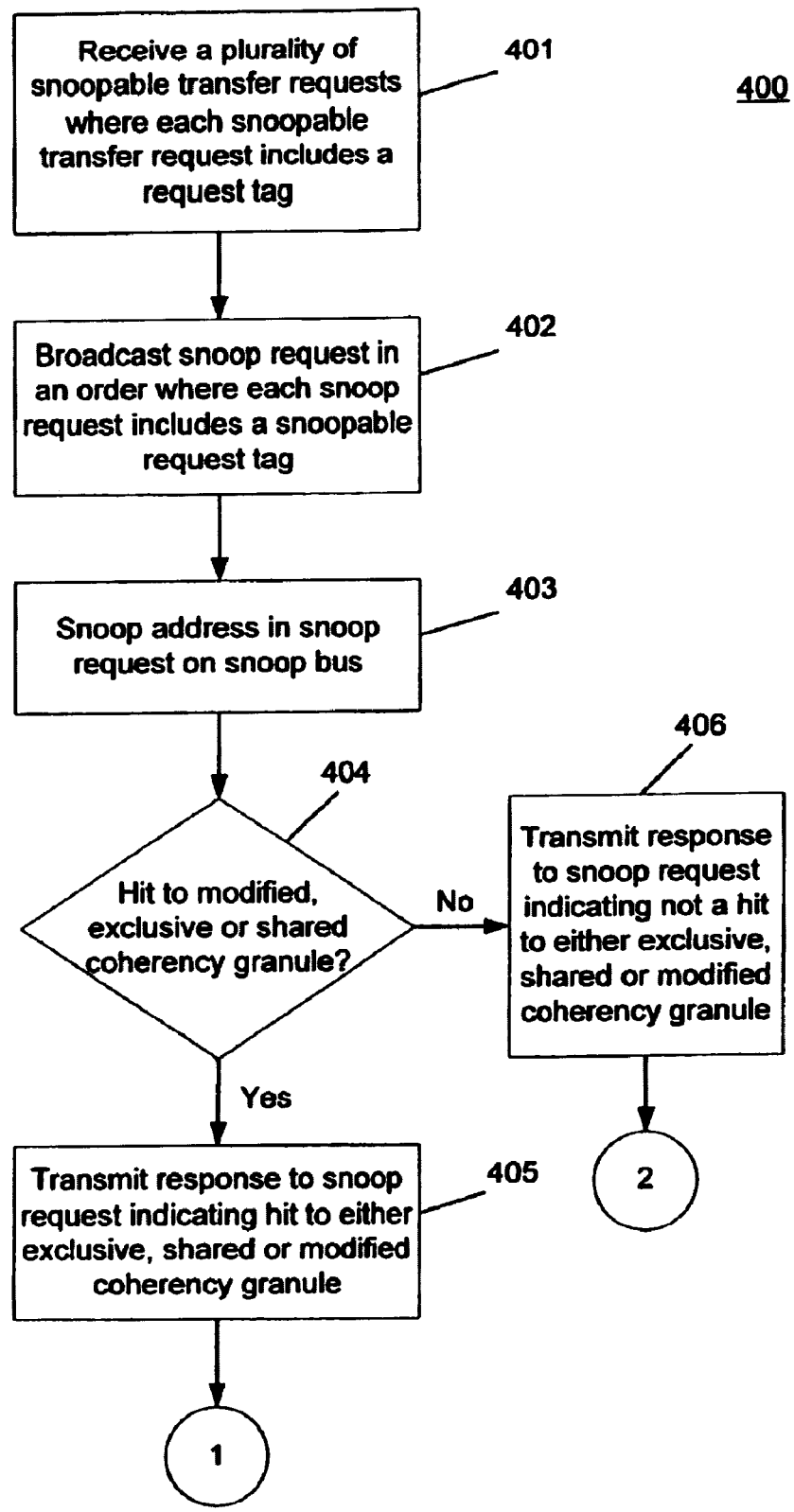
FIG. 4 is a flowchart of a method for ensuring orderly forward progress in granting snoop castout requests in accordance with an embodiment of the present invention.
Figure 4:
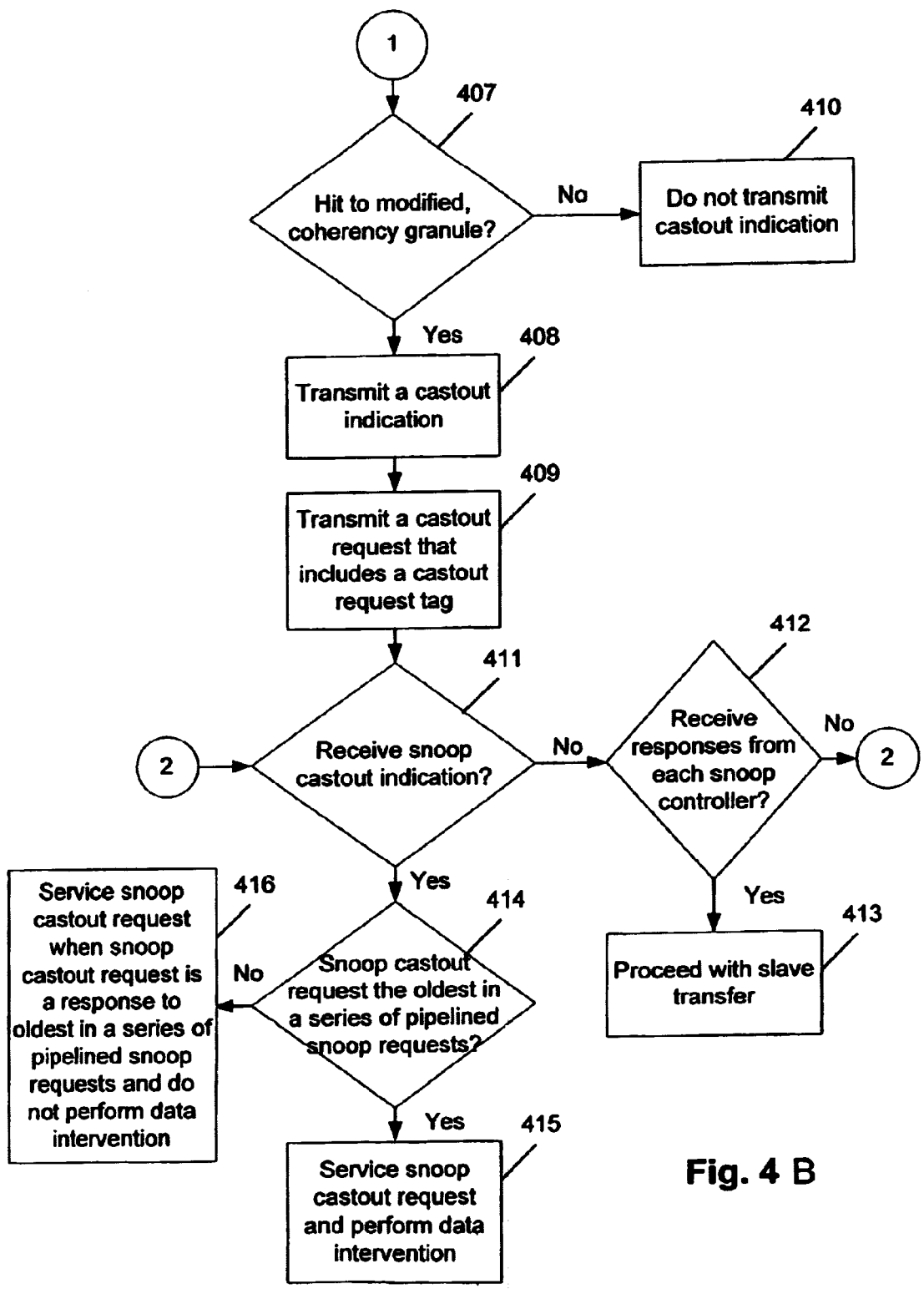

FIG. 4—Method for Ensuring Orderly Forward Progress in Granting Snoop Castout Requests FIG. 4 is a flowchart of one embodiment of the present invention of a method 400 for ensuring orderly forward progress in granting snoop castout requests.

Referring to FIG. 4, in conjunction with FIGS. 1–3, in step 401, bus macro 106 receives a plurality of snoopable transfer requests from one or more masters 101. It is noted that the plurality of snoopable transfer requests may be received by bus macro 106 in a single clock cycle. Each transfer request issued from master 101 may include a request tag as described above.

In step 402, bus macro 106 broadcasts the received snoopable transfer requests ("snoop requests") in a particular order on shared snoop bus 203 via snoop bus interface 202 to snoop controllers 103 not associated with the requesting masters 101. In one embodiment, bus macro 106 may be configured to track the order the snoop requests were broadcasted, at least in part, by associating each snoop request with the order, e.g., $5^{th}$ request, the snoopable transfer request was issued by master 101. As stated above, each snoop request issued from bus macro 106 may include a tag, referred to herein as a "snoop request tag," which includes the request tag transmitted by master 101 in step 401.

For each of the snoop requests broadcasted by bus macro 106, each snoop controller 103 in system 100 performms steps 403–408 and 410. It is noted that steps 403–408 and 410 are illustrative of the steps executed by snoop controller 103 and that snoop controller 103 may execute fewer steps than depicted. In step 403, snoop controller 103 snoops the address in the broadcasted snoop request on shared snoop bus 203. In step 404, a determination is made by snoop controller 103, e.g., snoop controller 103A, as to whether the address was a hit to either the modified, exclusive or shared coherency granule in the cache 102, 104, e.g., L1 cache 102A, associated with snoop controller 103. If the address was a hit to either the modified, exclusive or shared coherency granule in the cache 102, 104, e.g., L1 cache 102A, associated with snoop controller 103, then, in step 405, snoop controller 103 asserts the hit line (not shown) coupled to bus macro 106. If the address was not a hit to either the modified, exclusive or shared coherency granule in the cache, e.g., L1 cache 102A, associated with snoop controller 103, then, in step 406, snoop controller 103 de-asserts the hit line coupled to bus macro 106.

If there was a hit to either the modified, exclusive or shared coherency granule in the cache 102, 104, e.g., L1 cache 102A, associated with snoop controller 103, then in step 407, a determination is made by snoop controller 103 as to whether snoop controller 103 detected a hit to a modified coherency granule in its associated cache 102, 104, e.g., L1 cache 102A. If snoop controller 103 detected a hit to a modified coherency granule in its associated cache 102, 104, then, in step 408, snoop controller 103 transmits a castout indication indicating a "castout request" will be transmitted with its response.

In step 409, master 101, associated with snoop controller 103 that transmitted the castout indication, transmits a castout request that includes a castout request tag. The castout request may be identical to the received snoop request tag that includes the original master request tag.

If snoop controller 103 did not detect a hit to a modified coherency granule in its associated cache 102, 104, then, in step 410, snoop controller 103 does not transmit a castout indication. For example, snoop controller 103 may detect a hit to an exclusive or shared coherency granule in its associated cache 102, 104.

For each of the responses received by bus macro 106, bus arbiter 201, in step 411, determines if the received response is a snoop castout request.

If the received response to a snoop request is not a snoop castout indication, then, in step 412, bus arbiter 201 determines if a response has been received from each snoop controller 103 for the snoop request broadcasted. If there is a snoop controller 103 that has not responded to the broadcasted snoop request, then returning to step 411, bus arbiter 201 receives the response(s) from the other snoop controller(s) 103. If bus macro 106 has received responses from each snoop controller 103 for the snoop request broadcasted, then, in step 413, bus macro 106 services the snoop request broadcasted in the order the snoop request was issued. That is, if each snoop controller 103 in response to a snoop request did not assert the castout line, then the requests, e.g., read/read, to slave 107 proceed as normal.

If the received response to a snoop request is a snoop castout request, then, in step 414, bus arbiter 201 determines if the snoop castout request is a response to the oldest in a series of pipelined snoop requests using the request tag included in the castout request tag. As stated above, the castout request tag includes the request tag which indicates the order of the request issued from a particular master 101. Based on the information provided in the castout request tag, bus arbiter 201 determines if the snoop castout request is a response to the oldest outstanding snoop request in a series of pipelined snoop requests.

If the snoop castout request is a response to the oldest outstanding snoop request in a series of pipelined snoop requests, then, in step 415, bus arbiter 201 services the snoop castout request. Servicing the snoop castout request includes writing the modified data in the cache associated with the requesting snoop controller to slave 107, e.g., system memory, to maintain cache coherency. Further, in one embodiment, servicing the snoop castout request may include enacting data intervention. Data intervention may refer to bus macro 106 providing the data in the castout request to both slave 107 and the requesting master 101 concurrently.

If the snoop castout request is not a response to the oldest outstanding snoop request in a series of pipelined snoop requests, then, in step 416, bus arbiter 201 services the snoop castout request when the snoop castout request is a response to the oldest outstanding snoop request in a series of pipelined snoop requests. Further, if the snoop castout request is not a response to the oldest outstanding snoop request in a series of pipelined snoop requests, then, in step 416, data intervention is not implemented.

By bus arbiter 201 determining whether the castout request is a response to the oldest in a series of pipelined snoop requests to be serviced from the request tag included in the received castout request tag, bus macro 106 ensures orderly forward progress in granting snoop castout requests. By ensuring orderly forward progress in granting snoop castout requests, bus macro 106 may issue the next pipelined snoop request with less delay.

It is noted that method 400 may include other and/or additional steps that, for clarity, are not depicted. It is noted that method 400 may be executed in a different order presented and that the order presented in the discussion of FIG. 4 is illustrative. It is further noted that certain steps in method 400 may be executed in a substantially simultaneous manner.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for ensuring forward progress in granting snoop castout requests comprising the steps of:
    receiving a plurality of snoopable transfer requests from one or more masters, wherein each of said plurality of snoopable transfer requests compnses a request tag, wherein said request tag identifies a first order of a request issued from a master;
    broadcasting said plurality of snoopable transfer requests in a second order;
    receiving a castout request comprising a first request tag associated with a first snoopable transfer request; and
    servicing said castout request in said second order of broadcasting said plurality of snoopable transfer requests based on said first request tag.

2. The method as recited in claim 1 further comprising the step of:
    snooping an address in said first snoopable transfer request; and
    transmitting said castout request, comprising said first request tag associated with said first snoopable transfer request, if said address is a hit to a modified coherency granule in a cache.

3. The method as recited in claim 1, wherein each of said plurality of broadcasted snoopable transfer requests comprises a snoop request tag, wherein said snoop request tag comprises said request tag, wherein said snoop request tag further comprises an identifier identifying a particular requesting master.

4. The method as recited in claim 3, wherein said snoop request tag further comprises a read/write tag, wherein said read/write tag identifies whether an associated snoopable transfer request is a read or write request.

5. A system, comprising:
    a plurality of masters configured to access data, wherein one or more of said plurality of masters has a cache memory associated with it, wherein each of said plurality of cache memories is associated with a snoop controller;

one or more slaves configured to store data; and a bus coupling said plurality of masters to said one or more slaves, wherein said bus comprises:

logic for receiving a plurality of snoopable transfer requests from one or more masters, wherein each of said plurality of snoopable transfer requests comprises a request tag, wherein said request tag identifies a first order of a request issued from a master;

logic for broadcasting said plurality of snoopable transfer requests in a second order;

logic for receiving a castout request comprising a first request tag associated with a first snoopable transfer request from a first snoop controller; and logic for servicing said castout request in said second order of broadcasting said plurality of snoopable transfer requests based on said first request tag.

6. The system as recited in claim 5, wherein said first snoop controller comprises:

logic for snooping an address in said first snoopable transfer request; and logic for transmitting said castout request, comprising said first request tag associated with said first snoopable transfer request, to said bus if said address is a hit to a modified coherency granule in an associated cache memory.

7. The system as recited in claim 5, wherein each of said plurality of broadcasted snoopable transfer requests comprises a snoop request tag, wherein said snoop request tag comprises said request tag, wherein said snoop request tag further comprises an identifier identifying a particular requesting master.

8. The system as recited in claim 7, wherein said snoop request tag further comprises a read/write tag, wherein said read/write tag identifies whether an associated snoopable transfer request is a read or write request.

9. A system, comprising:

a plurality of masters configured to access data, wherein one or more of said plurality of masters has a cache memory associated with it, wherein each of said plurality of cache memories is associated with a snoop controller; and a bus coupling said plurality of masters, wherein said bus comprises:

logic for receiving a plurality of snoopable transfer requests from one or more masters, wherein each of said plurality of snoopable transfer requests comprises a request tag, wherein said request tag identifies a first order of a request issued from a master;

logic for broadcasting said plurality of snoopable transfer requests in a second order;

logic for receiving a castout request comprising a first request tag associated with a first snoopable transfer request from a first snoop controller; and logic for servicing said castout request in said second order of broadcasting said plurality of snoopable transfer requests based on said first request tag.

10. The system as recited in claim 9, wherein said first snoop controller comprises:

logic for snooping an address in said first snoopable transfer request; and logic for transmitting said castout request, comprising said first request tag associated with said first snoopable transfer request, to said bus if said address is a hit to a modified coherency granule in an associated cache memory.

11. The system as recited in claim 9, wherein each of said plurality of broadcasted snoopable transfer requests comprises a snoop request tag, wherein said snoop request tag comprises said request tag, wherein said snoop request tag further comprises an identifier identifying a particular requesting master.

12. The system as recited in claim 11, wherein said snoop request tag further comprises a read/write tag, wherein said read/write tag identifies whether an associated snoopable transfer request is a read or write request.

\* \* \* \* \*